United States Patent
Imao

(10) Patent No.: US 11,501,471 B2
(45) Date of Patent: Nov. 15, 2022

(54) VIRTUAL AND REAL COMPOSITE IMAGE DATA GENERATION METHOD, VIRTUAL AND REAL IMAGES COMPOSITING SYSTEM, TRAINED MODEL GENERATION METHOD, VIRTUAL AND REAL COMPOSITE IMAGE DATA GENERATION DEVICE

(71) Applicant: CASIO COMPUTER CO., LTD., Tokyo (JP)

(72) Inventor: Shogo Imao, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/168,868

(22) Filed: Feb. 5, 2021

(65) Prior Publication Data
US 2021/0248788 A1 Aug. 12, 2021

(30) Foreign Application Priority Data
Feb. 7, 2020 (JP) .............................. JP2020-020068

(51) Int. Cl.
*G06T 11/00* (2006.01)
*G06T 7/11* (2017.01)
(Continued)

(52) U.S. Cl.
CPC ................ *G06T 11/00* (2013.01); *G06N 3/04* (2013.01); *G06N 3/08* (2013.01); *G06T 7/11* (2017.01);
(Continued)

(58) Field of Classification Search
CPC . G06T 11/00; G06T 7/11; G06T 2207/20081; G06T 2207/20084;
(Continued)

(56) References Cited

U.S. PATENT DOCUMENTS 10,643,593 B1 * 5/2020 Kolen ....................... G10H 1/40
11,127,148 B1 * 9/2021 Edmonds ................ G06V 10/82
(Continued)

FOREIGN PATENT DOCUMENTS

JP 2009-134693 A 6/2009
JP 2011-215856 A 10/2011
(Continued)

OTHER PUBLICATIONS

Japanese Office Action dated Jan. 25, 2022 in a counterpart Japanese patent application No. 2020-020068. (A machine translation (not reviewed for accuracy) attached.).

*Primary Examiner* — YuJang Tswei
(74) *Attorney, Agent, or Firm* — Chen Yoshimura LLP

(57) ABSTRACT

A method for generating virtual and real composite image data includes: acquiring captured image data capturing an image of a real space as seen from a user's point of view; inputting the captured image data into a trained model, the training model outputting segmentation data segmenting the captured image data into a first region in which a target object is displayed, a second region in which at least a part of the user's body is displayed, and a third region that is other than the first and second regions; and compositing data of the first region and data of the second region with a virtual space image data based on the segmentation data.

9 Claims, 13 Drawing Sheets

(51) Int. Cl.
*G06N 3/04* (2006.01)
*G06N 3/08* (2006.01)
*G06F 11/00* (2006.01)

(52) U.S. Cl.
CPC .... *G06F 11/00* (2013.01); *G06T 2207/20081* (2013.01); *G06T 2207/20084* (2013.01); *G06T 2207/30196* (2013.01)

(58) Field of Classification Search
CPC .. G06T 2207/30196; G06N 3/04; G06N 3/08; G06N 3/0454; G06N 3/02; G10H 1/0008; G10H 2220/005; G10H 2220/401; G10H 2220/455; G06F 11/00
See application file for complete search history.

(56) References Cited

U.S. PATENT DOCUMENTS

| | | | |
|---|---|---|---|
| 2009/0110291 | A1 | 4/2009 | Matsumura et al. |
| 2016/0379413 | A1 | 12/2016 | Yamamoto et al. |
| 2018/0004286 | A1 | 1/2018 | Chen |
| 2018/0315329 | A1* | 11/2018 | D'Amato ............... G09B 5/02 |
| 2018/0373328 | A1* | 12/2018 | Sawaki ............... G02B 27/017 |
| 2020/0082544 | A1* | 3/2020 | Zhu ...................... G06V 20/40 |
| 2020/0275976 | A1* | 9/2020 | Mckinnon ............ G06N 20/00 |

FOREIGN PATENT DOCUMENTS

| | | |
|---|---|---|
| JP | 6524917 B2 | 6/2019 |
| JP | 2019-527881 A | 10/2019 |

* cited by examiner

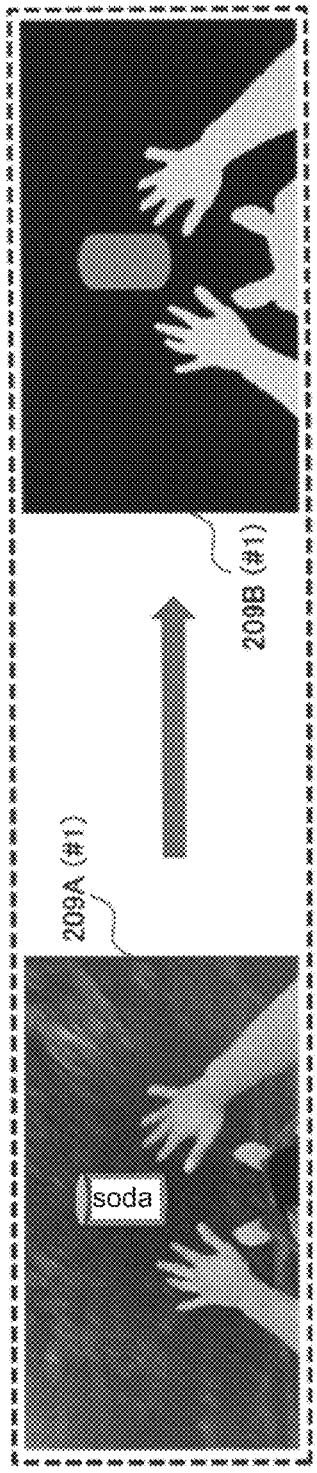
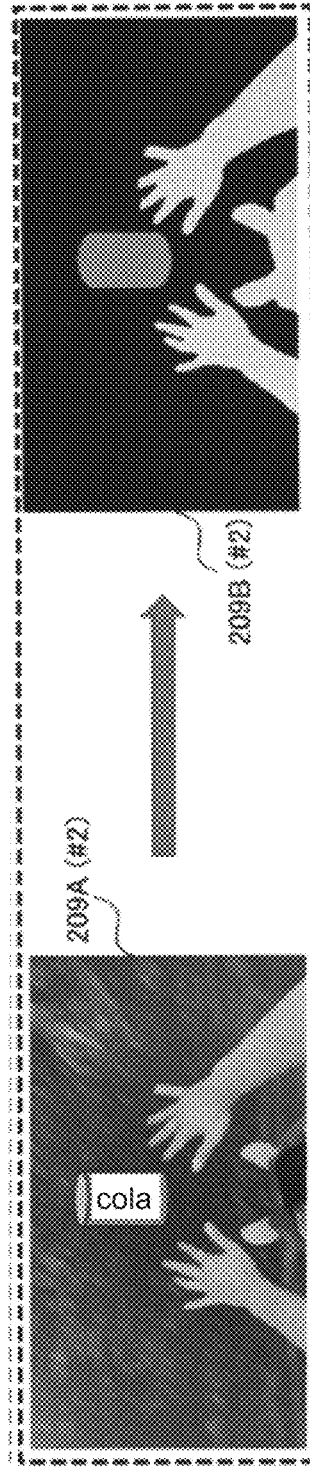
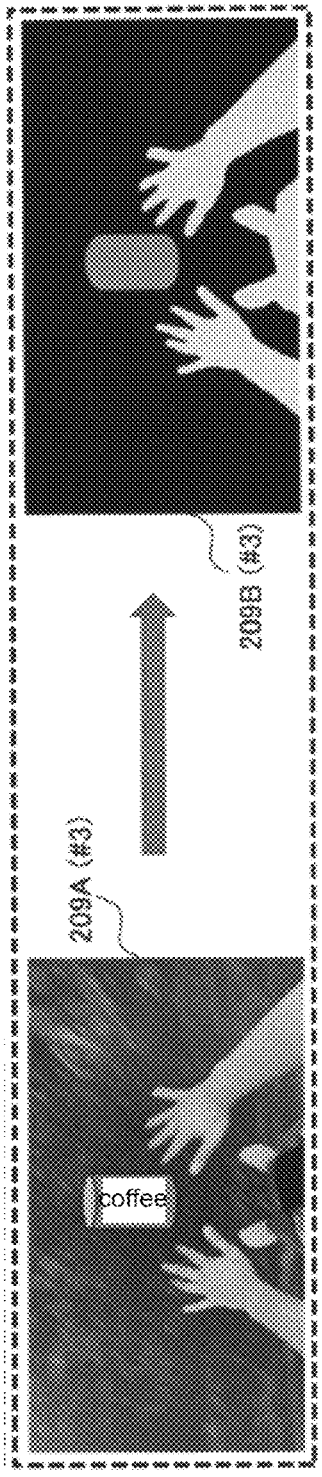

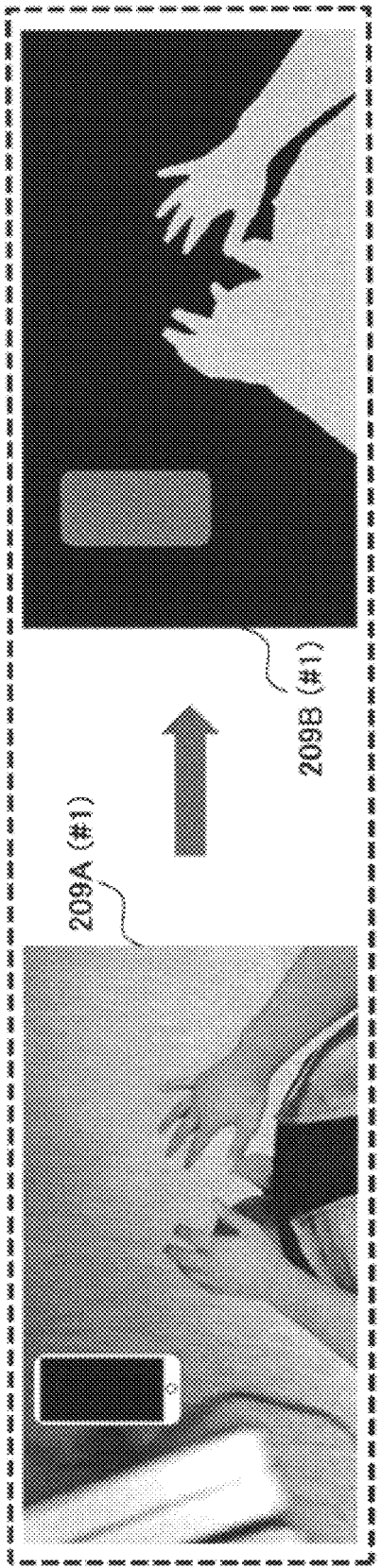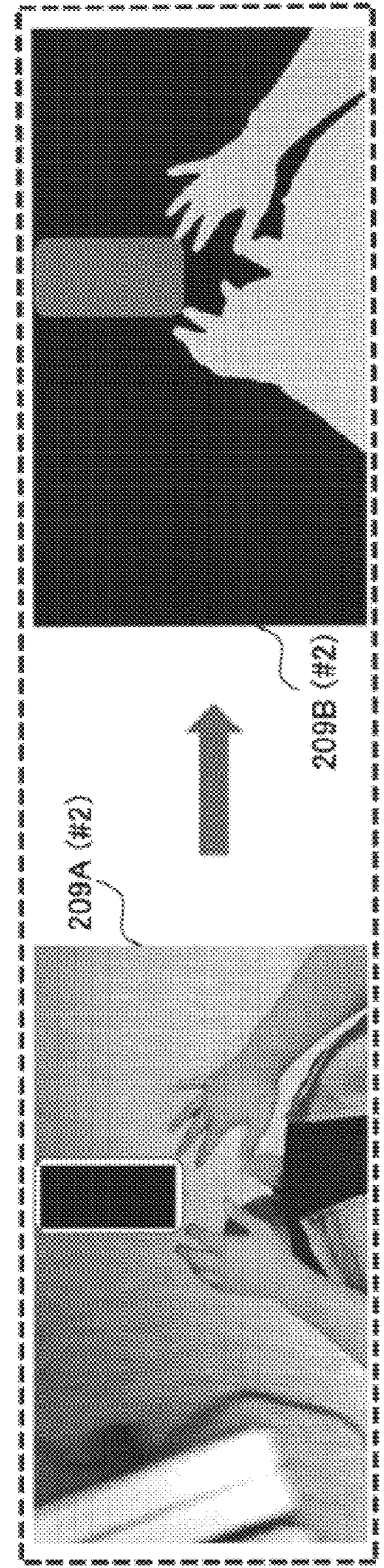

VIRTUAL AND REAL COMPOSITE IMAGE DATA GENERATION METHOD, VIRTUAL AND REAL IMAGES COMPOSITING SYSTEM, TRAINED MODEL GENERATION METHOD, VIRTUAL AND REAL COMPOSITE IMAGE DATA GENERATION DEVICE

BACKGROUND OF THE INVENTION

Technical Field

The present invention is a virtual and real composite image data generation method, a virtual and real images compositing system, a trained model generation method, and a virtual and real composite image data generation device.

Background Art

Chroma key synthesis technology is known as one of the conventional techniques for displaying a desired real object in a virtual (VR: Virtual Reality) space. This technique captures a desired real object in front of a homogeneous, specific color background, such as blue or green; makes the background transparent, which is part of the image captured from that particular color component; and synthesizes another image on the background part. According to such a chroma key synthesis technique, a desired real object can be cut out (extracted) in real time only by discriminating color components.

SUMMARY OF THE INVENTION

However, for example, when considering synthesizing a real scene in which a user plays a musical instrument at home or the like into a virtual space such as a concert venue, the above chroma key synthesizing technology requires an environment of a shooting space surrounded by a specific color background to be set up, but it is difficult for a general user to build such an environment because of required labor, space, and cost. Further, in the chroma key composition technology, since all the areas other than the region having a specific color in the captured image are cut out (extracted), objects other than the actual object to be cut out cannot be placed in the space.

For example, one must ensure that any object other than a desired object, such as a musical instrument, the user's body which are to be cut out, and the background of a specific color, not enter the captured image. Furthermore, if the desired object or the user's body to be cut out contains a region of that specific color, that region cannot be cut out.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a method for generating virtual and real composite image data, comprising: acquiring captured image data capturing an image of a real space as seen from a user's point of view; inputting the captured image data into a trained model, the training model outputting segmentation data segmenting the captured image data into a first region in which a target object is displayed, a second region in which at least a part of the user's body is displayed, and a third region that is other than the first and second regions; and compositing data of the first region and data of the second region with a virtual space image data based on the segmentation data.

In another aspect, the present disclosure provides a system of generating virtual and real composite image data, comprising: at least one camera capturing an image of a real space as seen from a user's point of view in real time; one or more processors that perform the following: acquiring captured image data capturing the image of the real space as seen from the user's point of view; inputting the captured image data into a trained model, the training model outputting segmentation data segmenting the captured image data into a first region in which a target object is displayed, a second region in which at least a part of the user's body is displayed, and a third region that is other than the first and second regions; and compositing data of the first region and data of the second region with a virtual space image data based on the segmentation data.

In another aspect, the present disclosure provides a method of generating a trained model, comprising: setting up a neural network having an input layer, one or more intermediate layers, and an output layer, the input layer being configured to receive captured image data capturing an image of a real space as seen from a user's point of view, the one or more intermediate layers having trainable parameters, the output layer being configured to output segmentation data segmenting the captured image data into a first region in which a target object is displayed, the second region in which at least a part of the user's body is displayed, and a third region that is other than the first and second regions; and training the one or more intermediate layers having the trainable parameters using training data, the training data including first input image data having one of the target object and the at least the part of the user's body in each image, second input image data having both of the target object and the at least the part of the user's body in each image, and third input image data having neither of the target object and the at least the part of the user's body in each image, and correct answer data providing correct segmentation of the target object and the at least the part of the user's body in each image of the first, second, and third image data.

In another aspect, the present disclosure provides a device for generating virtual and real composite image data, comprising one or more processors that perform the following: acquiring captured image data capturing an image of a real space as seen from a user's point of view; inputting the captured image data into a trained model, the training model outputting segmentation data segmenting the captured image data into a first region in which a target object is displayed, a second region in which at least a part of the user's body is displayed, and a third region that is other than the first and second regions; and compositing data of the first region and data of the second region with a virtual space image data based on the segmentation data.

It is to be understood that both the foregoing general description and the following detailed description are exemplary and explanatory, and are intended to provide further explanation of the invention as claimed.

BRIEF DESCRIPTION OF THE DRAWINGS

FIGS. 5A-5G are figures showing examples of variations of the training data.

FIGS. 11A-11C are explanatory drawings showing a cutout operation when the real object to be cutout is a canned drink and a part of a user's body.

FIGS. 12A-12B are explanatory drawings showing a cutout operation when the real object to be cutout is a smartphone and a part of a user's body.

DETAILED DESCRIPTION OF EMBODIMENTS

Figure 1:
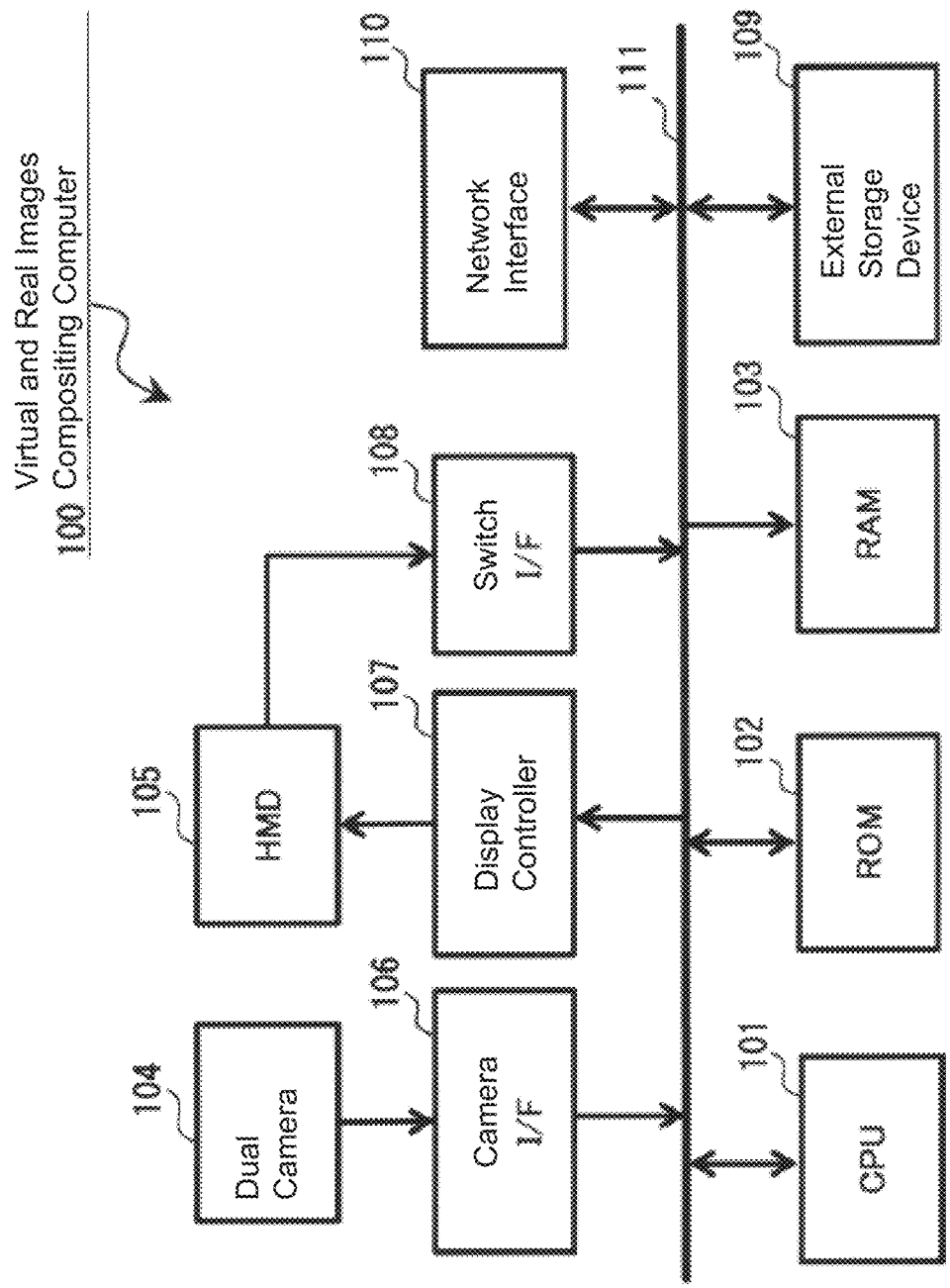
FIG. 1 is a block diagram which shows a hardware configuration example of an embodiment of a virtual and real images compositing computer according to this invention.

Hereinafter, embodiments for carrying out the present invention will be described in detail with reference to the drawings. FIG. 1 is a block diagram showing a hardware configuration example 100 of an embodiment of a virtual and real images compositing computer according to the present invention.

The virtual and real images compositing computer 100 may be a smartphone, a tablet terminal, a digital camera, and the like, instead of a normal personal computer. The virtual and real images compositing computer 100 shown in FIG. 1 includes a CPU (Central Processing Unit) 101, a ROM (Read Only Memory) 102, a RAM (Random Access Memory) 103, a dual camera 104, and a head mount display (HMD: Head Mounted Display) 105, camera I/F (interface) 106, display controller 107, switch I/F (interface) 108, external storage device 109, and network interface 110, which are connected to each other by the system bus 111. Various arithmetic processes for drawing images as illustrated in the following drawings may be executed by a GPU (Graphics Processing Unit) (not shown), but the following examples will be described such that they are executed by the CPU 101 for convenience of explanation. The configuration of the virtual and real images compo siting computer 100 is not limited to the configuration shown in FIG. 1.

The ROM 102, which is a read-only semiconductor memory, stores programs and data used for the virtual and real images compositing processing.

The CPU 101 executes, for example, a program for the information processing for the virtual and real images composition described below while using the RAM 103, which is a random accessible semiconductor memory, as a work area for the programs and data.

The dual camera 104 is a camera device including two camera units for inputting captured image data from the user's viewpoint. The captured images captured by the dual camera 104 are sequentially stored in the RAM 103 as captured image data via the camera I/F 106 and the system bus 111.

The virtual and real composite image synthesized by the information processing in the CPU 101 is displayed on the HMD 105 worn by the user via the RAM 103, the system bus 111, and the display controller 107. Instructions specified by the user by operating a switch(es) (not shown) on the HMD 105 are processed by the CPU 101 via the switch I/F 108 and the system bus 111.

The external storage device 109 is a storage device such as an SSD (Solid State Disk), a hard disk storage device, a magnetic disk storage device, an optical disk device, a magneto-optical disk device, or a tape device, and stores a large-scale data, such as training data, synthesized training data, and/or trained semantic segmentation model data, which will be explained below and will be loaded into the RAM 103 at appropriate time by the CPU 101 for processing.

The computer-readable recording medium that stores the programs and data used in this embodiment is a physical (non-temporary) recording medium such as ROM 102, RAM 103, external storage device 109, or a portable recording medium (not shown).

The network interface 110 receives various data such as the trained semantic segmentation model data from an external network such as a training computer 201 via a network such as a local area network or the Internet. Further, the program and various other data used in the present embodiment can be received from an external device via the network interface 110 and loaded into the RAM 103 for use.

The virtual and real images compositing computer 100 does not have to include all the components shown in FIG. 1, and conversely, other input devices (keyboard, mouse, etc.), output devices (displays for displaying data, printers, etc.), and a portable recording medium drive device may be added.

Figure 2:
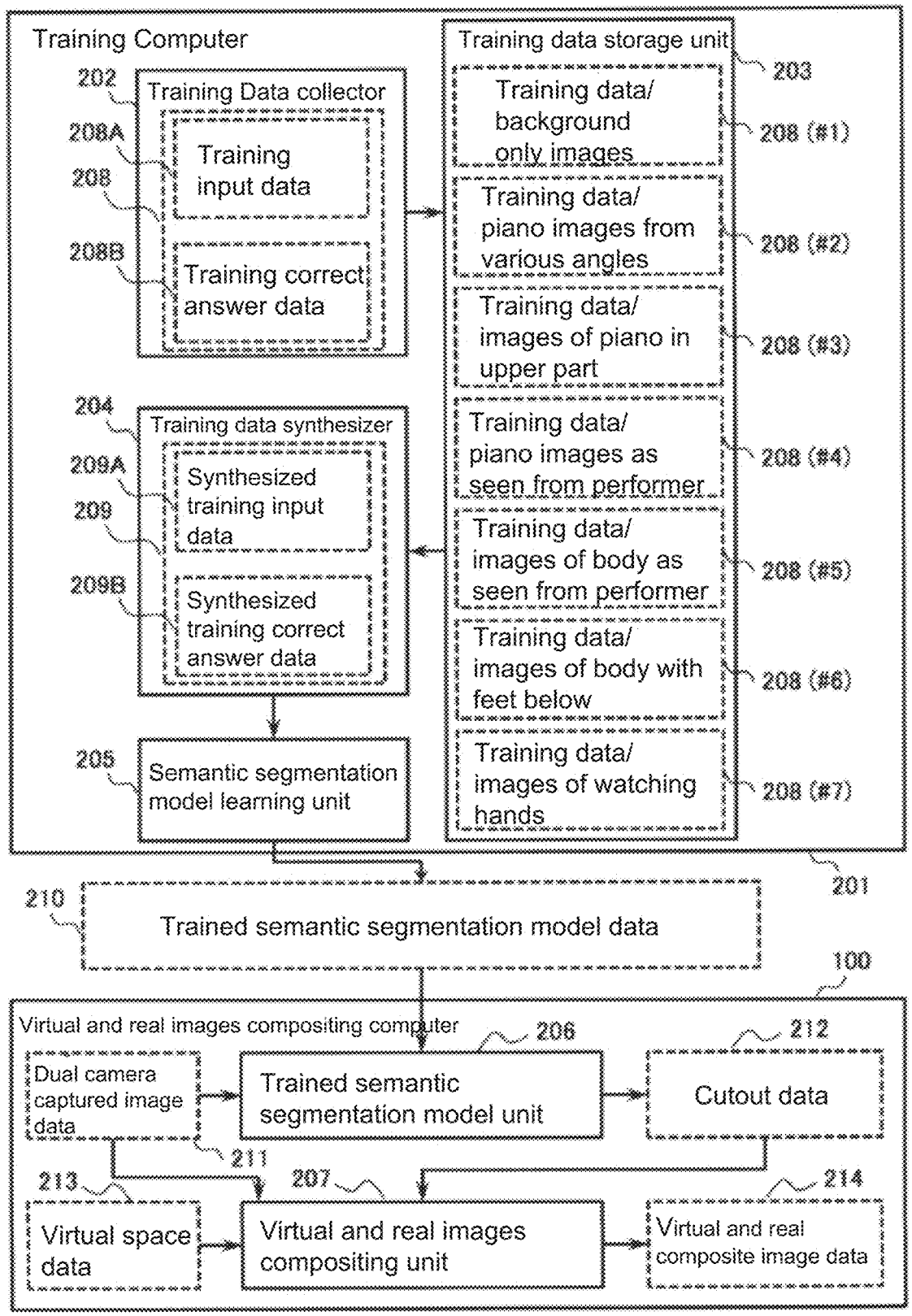
FIG. 2 is a block diagram of an embodiment of the virtual and real images compositing system.

FIG. 2 is a block diagram of an embodiment of a virtual and real images compositing system. The virtual and real images compositing system includes a training computer 201 and a virtual and real images compositing computer 100 having the hardware configuration example of FIG. 1.

The virtual and real images compositing computer 100 includes a trained semantic segmentation model unit 206 and a virtual and real images compositing unit 207, which are respectively functions executed by the CPU 101 of FIG. 1 when loading a virtual and real images compositing processing program from the ROM 102 into the RAM 103.

Figure 3A:
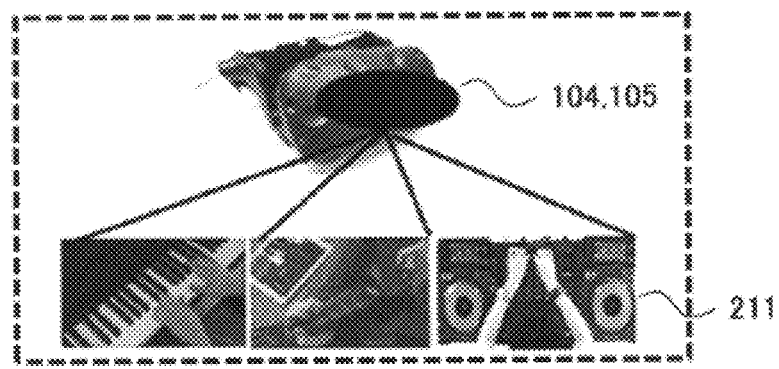
FIGS. 3A-3C are explanatory drawings of the cutout operation when the real object to be cutout is an electronic musical instrument and a part of a user's body.
Figure 3B:
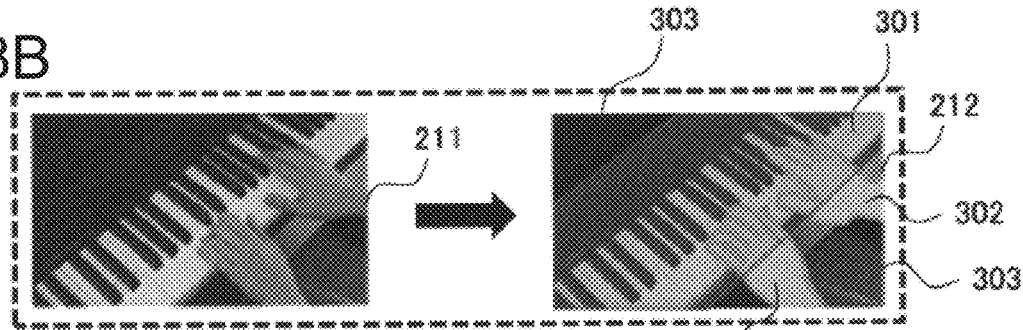

The trained semantic segmentation model unit 206 loads trained semantic segmentation model data 210 that have been stored in, for example, ROM 102 or an external storage device 109 in the virtual and real images compositing computer 100 transferred from the training computer 201 in advance at the time of factory settings or the like. The trained semantic segmentation model unit 206 is a convolutional neural network (CNN: Convolutional Neural Network) that executes a semantic segmentation operation on dual camera image data 211, examples of which are shown in FIG. 3A, that are input to the RAM 103 of FIG. 1 from the dual camera 104 integrated with the HMD 105 of FIG. 1 from the user's viewpoint. As a result, the trained semantic segmentation model unit 206 outputs the cutout data 212 that have a label on each pixel of the pixels of the image data having the same size as the dual camera image data, indicating that the pixel is in any one of the cutout area (first area) 301 of a target object such as an electronic musical instrument, an example of which is shown in FIG. 3B (or maybe a musical instrument that is not an electronic musical instrument), the cutout area (second area) 302 of a part of the body of a user (a player) playing the electronic musical instrument, for example, and the background area (third area) 303 that is an area other than these areas. The resulting cutout data 212 are stored in the RAM 103.

Figure 3C:
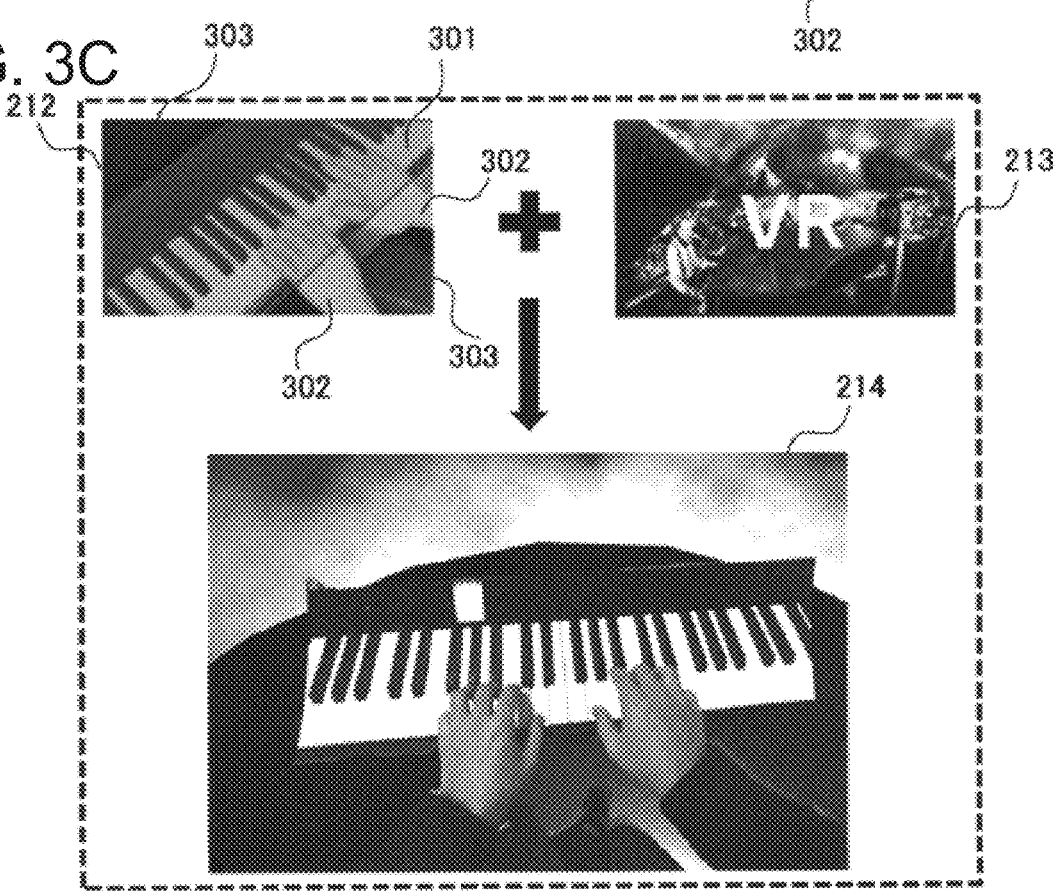

As shown in FIG. 3C, on the image data of the same size as the dual camera image data 211, the virtual and real images compositing unit 207 composites virtual space image data 213, which is different from the dual camera image data 211, such as a concert audience image, onto the background area 303, which is the area other than the cutout area 301 of the electronic musical instrument and the cutout area 302 of a part of the body, as indicated (labelled) by the cutout data 212, or composites the cutout area 301 of the electronic musical instrument and the cutout area 302 of a part of the body, as indicated (labelled) by the cutout data 212, onto the virtual space image data 213, which is different from the dual camera image data 211, such as a concert audience image. The virtual and real composite image data 214 obtained as a result of these composition is sequentially stored in the RAM 103. Then, the virtual and real images compositing unit 207 causes the virtual and real composite video data 214 to be displayed on the display of the HMD 105 of FIG. 1 worn by the performer or the like from the RAM 103 of FIG. 1 via the system bus 111 and the display controller 107.

As a result, through the HMD 105, the performer or the like who is a user can obtain a very realistic feeling as if he or she is playing the electronic musical instrument or the like in front of the audience at the concert venue.

The training computer 201 is, for example, a computer that is operated at the time of shipment from the factory, and is separate from the virtual and real images compositing computer 100 provided to the user as a product. The training computer 201 may be a general-purpose, high-performance computer having a CPU, ROMs, RAMs, an external storage device, and a system bus, similar to those shown in FIG. 1. The training computer 201 includes a training data collecting unit 202, a training data synthesizing unit 204, and a semantic segmentation model learning unit 205, which are respectively functions implemented by executing a program loaded from a ROM into a RAM by a CPU or are dedicated functions by a GPU (not shown). Further, the training computer 201 includes a training data storage unit 203, which is an external or internal storage device or RAM/ROM for storing various training data.

Figure 4A:
FIGS. 4A-4B are figures showing an example of the training data (training input data and training correct answer data).
Figure 4B:
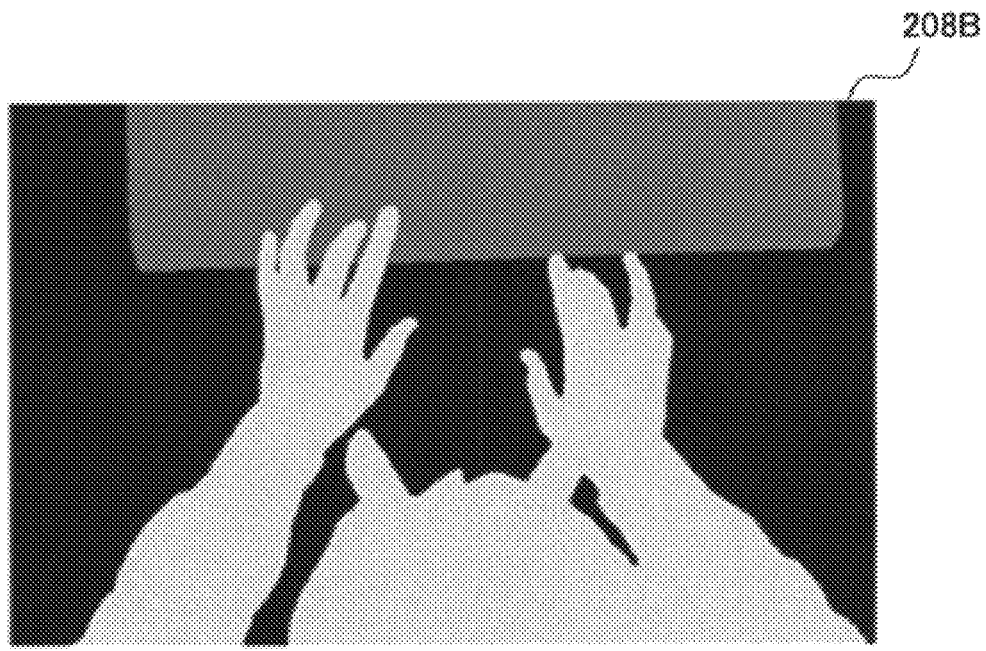

The training data collection unit 202 collects the training data 208 that consist of the training input data 208A, which are captured image data from a camera (not shown) from the user's viewpoint in the real space, and which include the background, at least one or more objects, and/or a part of the user's body operating the objects, and the training correct answer data 208B, which are the correct cutout data indicating the correct cutout area including the first area corresponding to the object and/or the second area corresponding to a part of the user's body, cut out from the captured image by using a chroma key synthesis technique. FIGS. 4A and 4B show examples of the training input data 208A and the training correct answer data 208B, respectively. The training correct answer data 208B is answer data correctly indicating a cutout region in which an electronic musical instrument and a part of the body of a performer who plays the electronic musical instrument are cut out from the training input data 208A, for example.

The training data storage unit 203 stores the training data 208 (pairs of the training input data 208A and the training correct answer data 208B) by classifying them into a plurality of groups, such as a background, a target object, and a part of the user's body in terms of how they appear in the captured image data so that the training data 208 are classified and stored in the corresponding separate folders, each of which contains tens of thousands of the pairs of data.

More specifically, when the target object is an electronic musical instrument, for example, the training data storage unit 203 stores pairs of input data and correct answer data of the background only images 208 (#1), which are exemplified in FIG. 5A, that are imaged regions other than the electronic musical instrument and a part of the user's body, in a separate folder.

Further, the training data storage unit 203 stores pairs of input data and correct answer data of the piano images 208 (#2), which are exemplified in FIG. 5B, that are taken from various angles without specifying the angle or location, into a separate folder.

Further, the training data storage unit 203 stores pairs of input data and correct answer data of the images 208 (#3) in which the piano is shown in the upper part, which are exemplified in FIG. 5C, in a separate folder.

Further, the training data storage unit 203 stores pairs of input data and correct answer data of the piano images 208 (#4) as seen from the front at the angle of playing the piano, which are exemplified in FIG. 5D, in a separate folder.

Further, the training data storage unit 203 stores pairs of input data and correct answer data of the images 208 (#5), which are exemplified in FIG. 5E, that freely look over the player's body, into a separate folder, Further, the training data storage unit 203 stores pairs of input data of the images 208 (#6), which are exemplified in FIG. 5F, that freely look over the player's body within the range in which the player's feet are visible in the lower part of the image, in a separate folder.

Figure 5G:
Figure 5G:
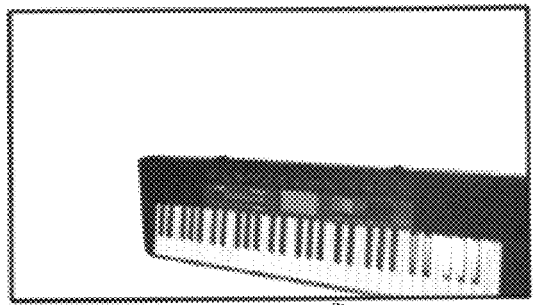
Figure 5G:
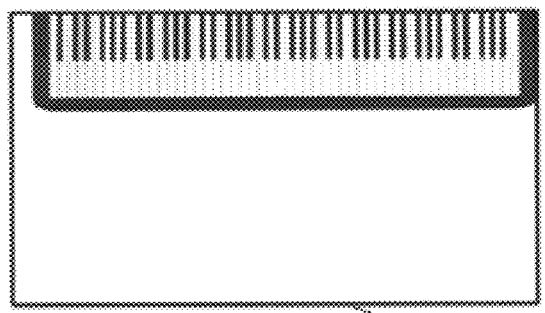
Figure 5G:
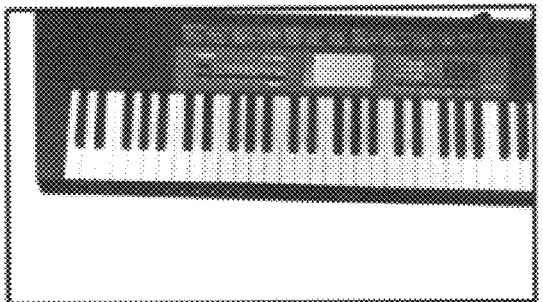
Figure 5G:
Figure 5G:
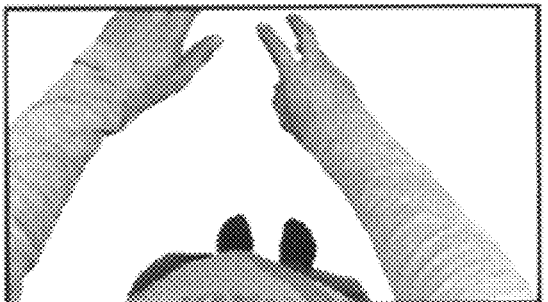
Figure 5G:
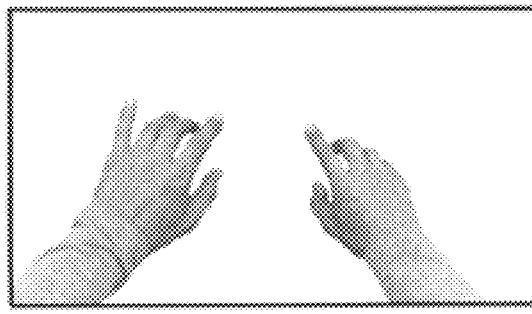

Moreover, the training data storage unit 203 stores pairs of input data and correct answer data of the images 208 (#7) in which the performer is looking at his/her hands, an example of which is illustrated in FIG. 5G, in a separate holder.

The training data synthesizing unit 204 randomly selects the training data 208 (pairs of the training input data and the training correct answer data) from the plurality of these grouped folders so that the collected data include: a background and the target object; a background and a part of the user's body; and a background, the target object, and a part of the user's body, respectively. Then, the training data synthesizing unit 204 synthesizes these grouped images of the training input data 208A (captured image data) of the selected learning data 208 so as not to appear unnatural from the user's viewpoint, and generates the synthesized training input data 209A for each combination of images. Further, the training data synthesizing unit 204 synthesizes the corresponding training correct answer data 208B (correct cutout image data) of the selected training data 208, and generates the synthesized training correct answer data 209B that respectively correspond to the synthesized training input data 209A.

"Generation of Training Data of Background Only"

Figure 6A:
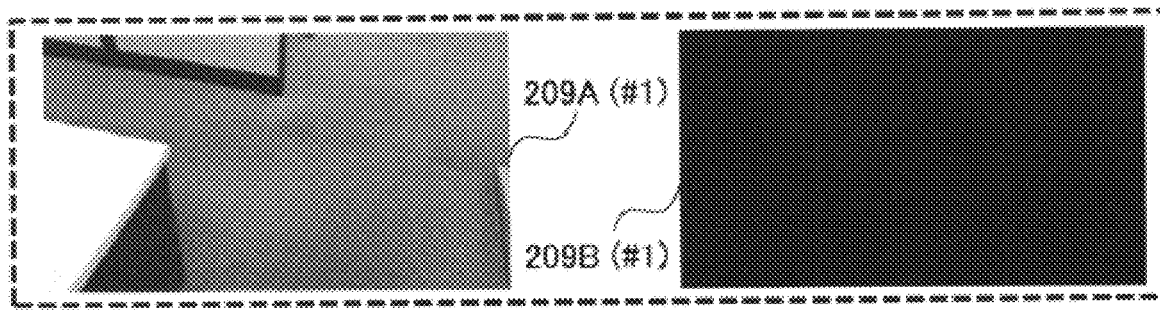
FIGS. 6A-6E are figures showing examples of the synthesized training input data and synthesized training correct answer data.

More specifically, as shown in FIG. 6A, the training data synthesizing unit 204 selects tens of thousands of the background-only images 208 (#1) from the training data storage unit 203, and outputs the training input data 208A (#1) of the selected images 208 (#1), as it is, as the synthesized training input data 209A (#1), and outputs the training correct answer data 208B (#1) as it is as the synthesized training correct answer data 209B (#1).

"Generation of Training Data of Background+Piano"

Figure 6B:
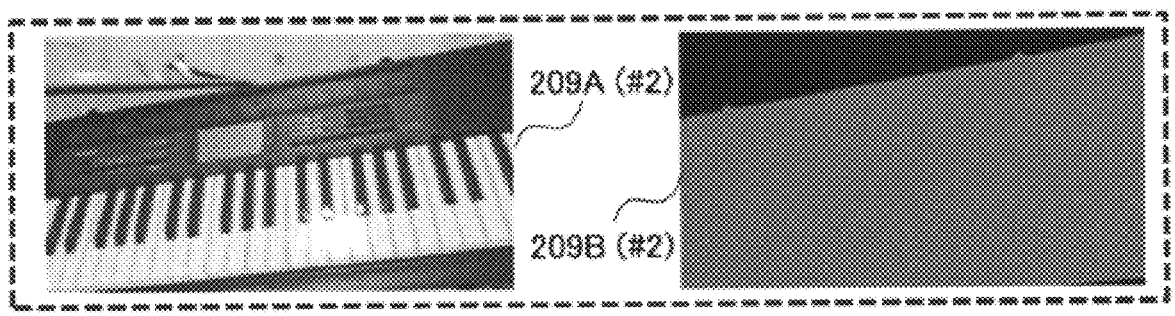

Further, the training data synthesizing unit 204 selects the piano images from various angles 208 (#2) (a piano image from a certain angle is illustrated in FIG. 5B) and images of the background only 208 (#1) from the training data storage unit 203 (exemplified in FIG. 5A), and combines the piano training input data 208A (#2) and the background-only training input data 208A (#1) so the images of #2 are respectively overlayed on the image of #1. The training data synthesizing unit 204 then outputs the resulting combined data as the synthesized training input data 209A (#2), an example of which is shown in FIG. 6B. Similarly, the piano training correct answer data 208 (#2) and the background-only training correct answer data 208 (#1) are combined so that the images of #2 are respectively overlayed on the images of #1, and the combined image data are output as the corresponding synthesized training correct answer data 209B (#2), an example of which is shown in FIG. 6B.

"Generation of Training Data of Background+Body (Hand+Feet)"

Figure 6C:
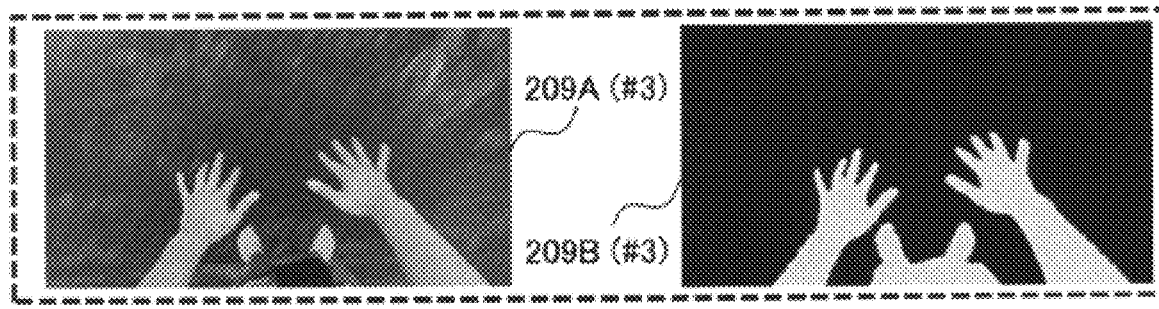

Further, the training data synthesizing unit 204 selects the images 208 (#6) overlooking the body freely and the images 208 (#1) of the background only from the training data storage unit 203, combines the training input data 208A (#6) and the training input data 208A (#1) so that the images of #6 are respectively overlayed on the images of #1, and outputs the resulting combined data as the synthesized training input data 209A (#3), an example of which is shown in FIG. 6C. Similarly, the corresponding training correct answer data 208B (#6) and 208B (#1) are combined so that the images of #6 are respectively overlayed on the images of #1, and the resulting combined data are outputted as the synthesized training correct answer data 209B (#3), an example of which is shown in FIG. 6C.

"Generation of Training Data of Background+Part of Body (Hand)"

Further, the training data synthesizing unit 204 selects the images 208 (#7) in which the performer is looking at his/her hands and the images 208 (#1) of the background only from the training data storage unit 203. The training input data 208A (#7) and 208A (#1) are combined so that the images of #7 are respectively overlayed on the images of #1, and the combined data are outputted as the synthesized training input data 209A (not shown in the figures). Similarly, the corresponding training correct answer data 208B (#7) and 208B (#1) are combined so that the images of #7 are respectively overlayed on the images of #1, and are outputted as the synthesized training correct answer data 209B (not shown in the figures).

"Generation of Training Data of Background+Piano and a Part of the Body not Overlapping with the Piano"

Figure 6D:
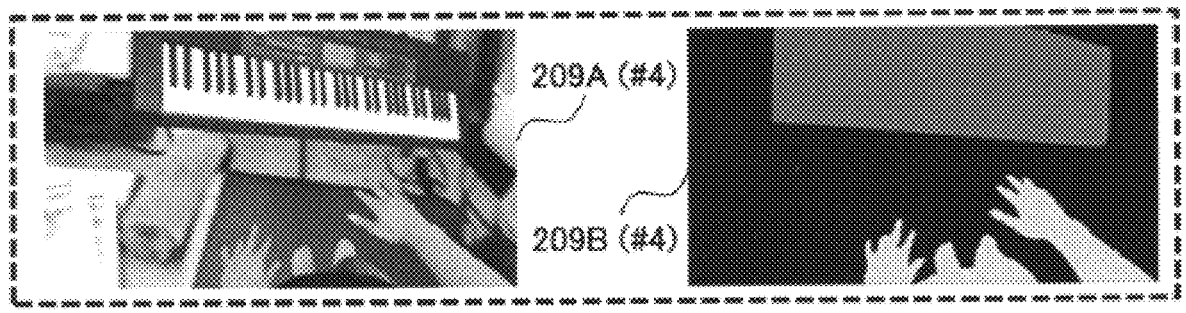

Further, the training data synthesizing unit 204 selects the images 208 (#3) in which the piano is shown in the upper part, the images 208 (#6) showing the player's body where the player's feet are visible in the lower part of the image, and the images 208 (#1) of the background only from the training data storage unit 203, combines the training input data 208A (#3), 208A (#6) and 208A (#1) such that the images of #3 are respectively overlayed on the images of #1 and that the images of #6 are respectively overlayed on the images of #3, and outputs the resulting combined data as the synthesized training input data 209A (#4), an example of which is shown in FIG. 6D. Similarly, the training correct answer data 208B (#3), 208B (#6), and 208B (#1) are combined such that the images of #3 are respectively overlayed on the images of #1 and that the images of #6 are respectively overlayed on the images of #3, and the combined data are outputted as the synthesized training correct answer data 209B (#4), an example of which is shown in FIG. 6D.

"Generation of Training Data of Background+Piano and a Part of the Body Overlapping with the Piano"

Figure 6E:
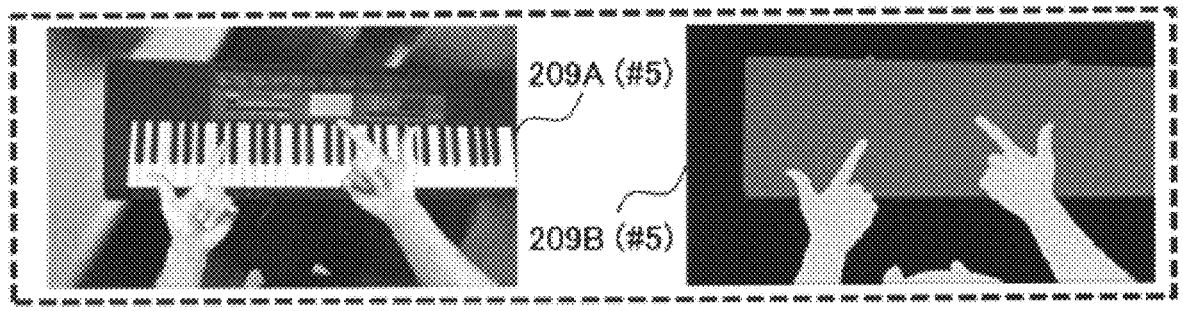

Further, the training data synthesizing unit 204 collects the piano images 208 (#4) taken from the front at the angles of the performer playing, the images 208 (#7) in which the performer is looking at his/her hands, and the images 208 (#1) of the background only from the training data storage unit 203, combines the training input data 208A (#4), 208A (#7), and 208A (#1) such that the images of #4 are respectively overlayed on the images of #1 and that the images of #7 are respectively overlayed on the images of #4, and outputs the resulting combined data as the synthesized training input data 209A (#5), an example of which is shown in FIG. 6E. Similarly, the training correct answer data 208B (#4), 208B (#7), and 208B (#1) are combined such that the images of #4 are respectively overlayed on the images of #1 and that the images of #7 are respectively overlayed on the images of #4, and the combined data are outputted as the synthesized training correct answer data 209B (#5), an example of which is shown in FIG. 6E.

The semantic segmentation model learning unit 205 provides tens of thousands of the synthesized training input data 209A generated by the training data synthesizing unit 204 to the input layer of a convolutional neural network, and provides the corresponding synthesized correct answer data 209B to the output layer of the convolutional neural network, and the parameters of the intermediate layer of the convolutional neural network are learned based on the algorithm of semantic segmentation. As the algorithm for semantic segmentation, various known proposed techniques can be adopted.

As a result, the semantic segmentation model learning unit 205 outputs the structural data of the convolutional neural network and the data set of the parameters of the trained intermediate layers as the trained semantic segmentation model data 210. The trained semantic segmentation model data 210 are stored in the ROM 102 or the external storage device 109 of FIG. 1, which corresponds to the trained semantic segmentation model unit 206 of FIG. 2, in the virtual and real images compositing computer 100 of FIG. 1.

The trained semantic segmentation model unit 206 forms a convolutional neural network based on the structural data of the convolutional neural network and the trained parameters of the intermediate layer read from the ROM 102 or the external storage device 109, and receives the dual camera captured image data 211 at the input layer to execute the semantic segmentation calculation in the intermediate layers so as to output the cutout data 212 from the output layer.

As described above, in the present embodiment, the training data synthesizing unit 204 can generate highly realistic and accurate synthesized training input data 209A that contain a background and a target object, a background and a part of the user's body, and/or a background, the target object, and a part of the user's body, and corresponding synthesized training correct answer data 209B. Based on these synthesized training data 209, the semantic segmentation model learning unit 205 can generate well-trained, adequate semantic segmentation model data (segmentation data) 210. Therefore, the trained semantic segmentation model unit 206 in which the model data is set can execute a highly accurate semantic segmentation calculation on the dual camera captured image data 211, and can output the cutout data 212 with high cutout accuracy. As a result, the virtual and real images compositing unit 207 can provide the HMD 105 with highly realistic virtual and real composite video image data 214, and the performer of an electronic musical instrument or the like can enjoy the performance based on the virtual and real composite video full of realism.

Figure 7:
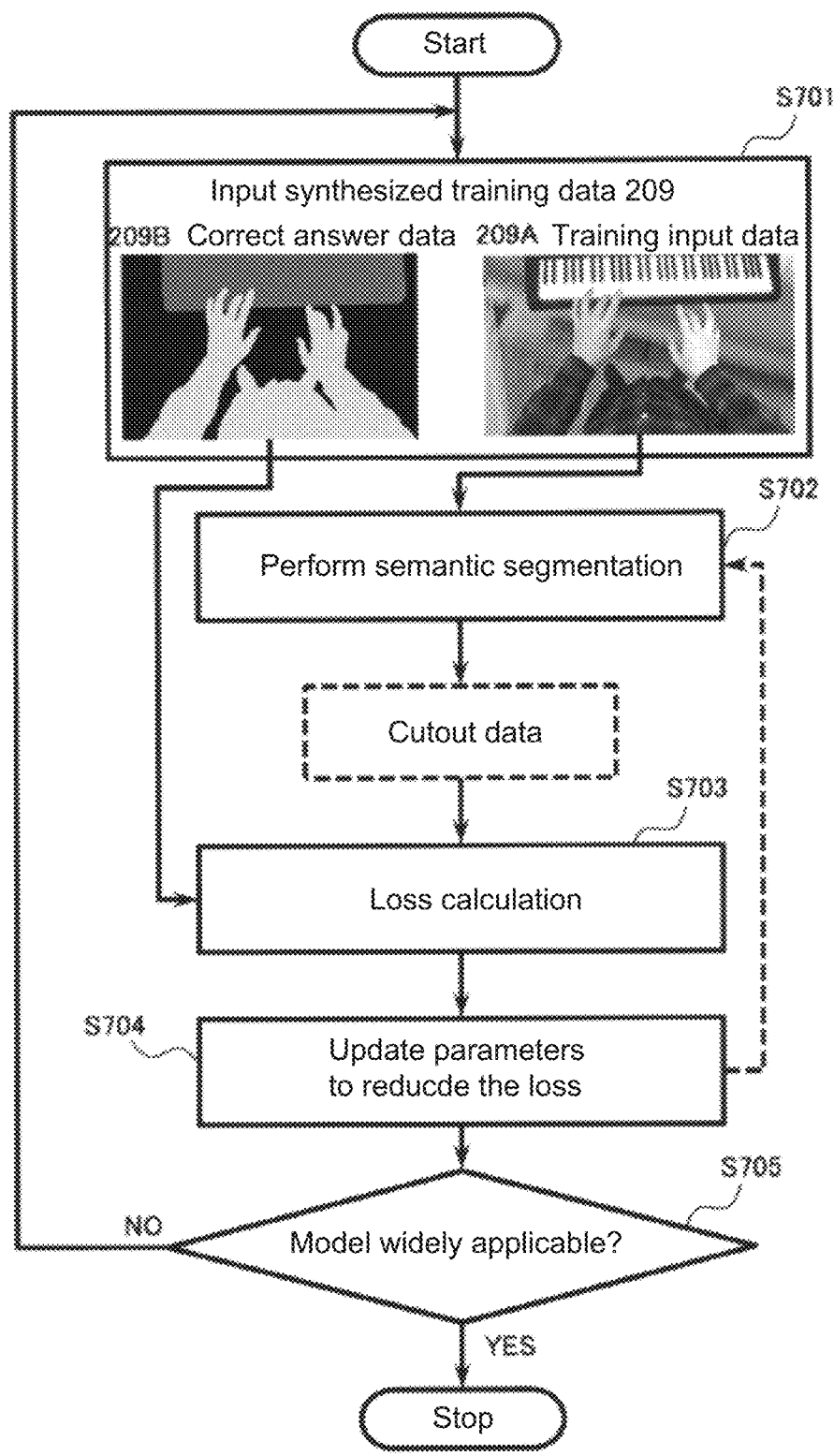
FIG. 7 is a flowchart showing a processing example of the training phase.

FIG. 7 is a flowchart showing an example of training process for the semantic segmentation model by the training computer 201 of FIG. 2. This training process is a process executed by a CPU (hereinafter, referred to as a "training processor") in the training computer 201 that reads a learning process program stored in a ROM into a RAM.

First, the training processor inputs, from tens of thousands of pairs of the synthesized training data 209 composed of, for example, synthesized training input data 209A and synthesized training correct answer data 209B, a single pair of the synthesized training input data 209A and the synthesized training correct answer data 209B into RAM 103 (step S701).

Next, the training processor provides the synthesized training input data 209A inputted in step S701 to the input layer of the convolutional neural network whose structure is predetermined, and executes the semantic segmentation operation in the intermediate layers to output the cutout data from its output layer (step S702). As the model structure of the semantic segmentation, various known schemes can be used.

Further, the training processor calculates the loss that indicates the difference between the cutout data obtained in step S702 and the synthesized training correct answer data 209B inputted in step S701 (step S703). As the loss function in the loss calculation here, a known Dice loss can be adopted because it can produce a highly accurate model for training data having a large proportion of background data (unbalanced data) as in the present embodiment.

Further, in the loss calculation process of step S703, because the background portion has a wide variety of data variations and the inference accuracy would be lowered if characteristics of the background were to be learned, the loss value for "musical instrument" and "other (background+body)" and the loss value for "body" and "other (background+musical instrument)" can be calculated and averaged to obtain the final loss value. Thus, the loss value of "background" and "others (instrument+body)" are not used because the inference accuracy is reduced.

Next, the training processor updates the parameters of the intermediate layers of the convolutional neural network model so as to reduce the loss value calculated in the loss calculation in step S703 (step S704).

After that, the training processor repeats the processes of steps S701 to S704 until a model having high general applicability can be created (step S705: NO).

Once the model with high general applicability is created, the training processor finishes the training process shown in the flowchart of FIG. 7, and output the structural data of the convolutional neural network and the data set of the finalized trained parameters of the intermediate layers as the trained semantic segmentation model data 210.

Figure 8:
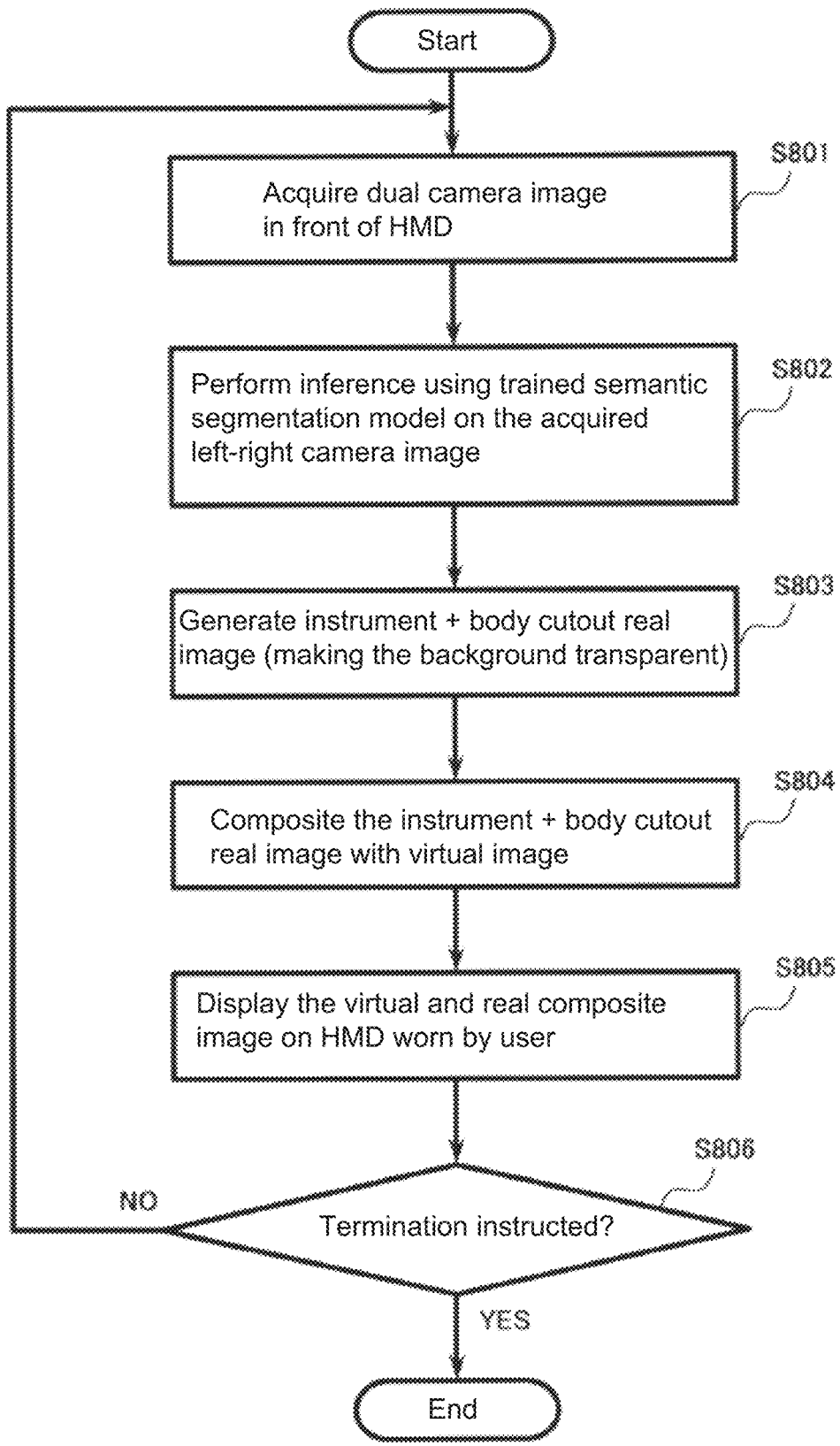
FIG. 8 is a flowchart showing a processing example of the implementation phase.

FIG. 8 is a flowchart showing an example of the virtual and real images compositing processing by the virtual and real images compositing computer 100 of FIG. 1. This process is a process executed by the CPU 101 of FIG. 1 by reading a virtual and real images compositing processing program stored in the ROM 102 into the RAM 103.

As described above, the trained semantic segmentation model data 210 outputted from the training computer 201 by the training process exemplified in the flowchart of FIG. 7 is set in the virtual and real images compositing computer 100 of FIG. 2 in advance by factory setting or the like. For example, it is stored in the ROM 102 or the external storage device 109.

The CPU 101 acquires the dual camera image data 211 for one frame, which represents an image from the user's point of view, from the dual camera 104 integrated with the HMD 105 of FIG. 1 (see FIG. 3A), and inputs it to the RAM 103 of FIG. 1 (step S801).

Next, the CPU 101 executes the process of the trained semantic segmentation model unit 206 of FIG. 2. First, the CPU 101 forms a convolutional neural network on the RAM 103 based on the structural data and the trained parameters of the intermediate layers of the convolutional neural network read from the ROM 102 or the external storage device 109. Subsequently, the CPU 101 inputs the left and right dual camera image data 211 acquired in step S801 to the input layer of the convolutional neural network, and executes inference processing by the convolutional neural network calculation of semantic segmentation in the intermediate layers (step S802).

Then, the CPU 101 outputs the cutout data 212 for respective pixels of the image data having the same size as the dual camera captured image data 211 (see FIG. 3B) (step S803). In the cutout data 212, the cutout area 301 of a target object, for example, an electronic musical instrument, is assigned a particular label value, and the cutout area 302 of a part of the body of a user who is a performer playing the electronic musical instrument, for example, is assigned another separate label value. The area 303 other than these areas, for example, a background area, is assigned a transparency label value. The cutout data 212 is stored in the RAM 103.

Next, the CPU 101 executes the process of the virtual and real images compositing unit 207 of FIG. 2. First, the CPU 101 composites the image data of the cutout data 212 having the background area 303 with the transparency value with one-frame image data of the virtual space image data 213 that is stored in the external storage device 109, for example, so as to create the image data of one frame of the virtual and real composite image data 214 and store it in the RAM 103 (step S804).

Then, the CPU 101 causes the one frame of virtual and real composite image data 214 which was generated in step S804 and stored in the RAM 103, to be displayed on the display of the HMD 105 of FIG. 1 through the RAM 103, the system bus 111, and the display controller 107 in FIG. 1 (step S805).

After that, the CPU 101 determines whether or not the performer has provided instructions to stop the execution of the virtual and real images compositing process by operating a switch (not shown) on the HMD 105 through the switch I/F 108 and the system bus 111 (Step S806).

If the determination in step S806 is NO, the CPU 101 returns to the process in step S801 and continues executing a series of the virtual and real images compo siting processes from steps S802 to S806 for the next frame image.

When the determination in step S806 becomes YES, the CPU 101 ends the execution of the virtual and real images compositing process shown in the flowchart of FIG. 8.

Figure 9:
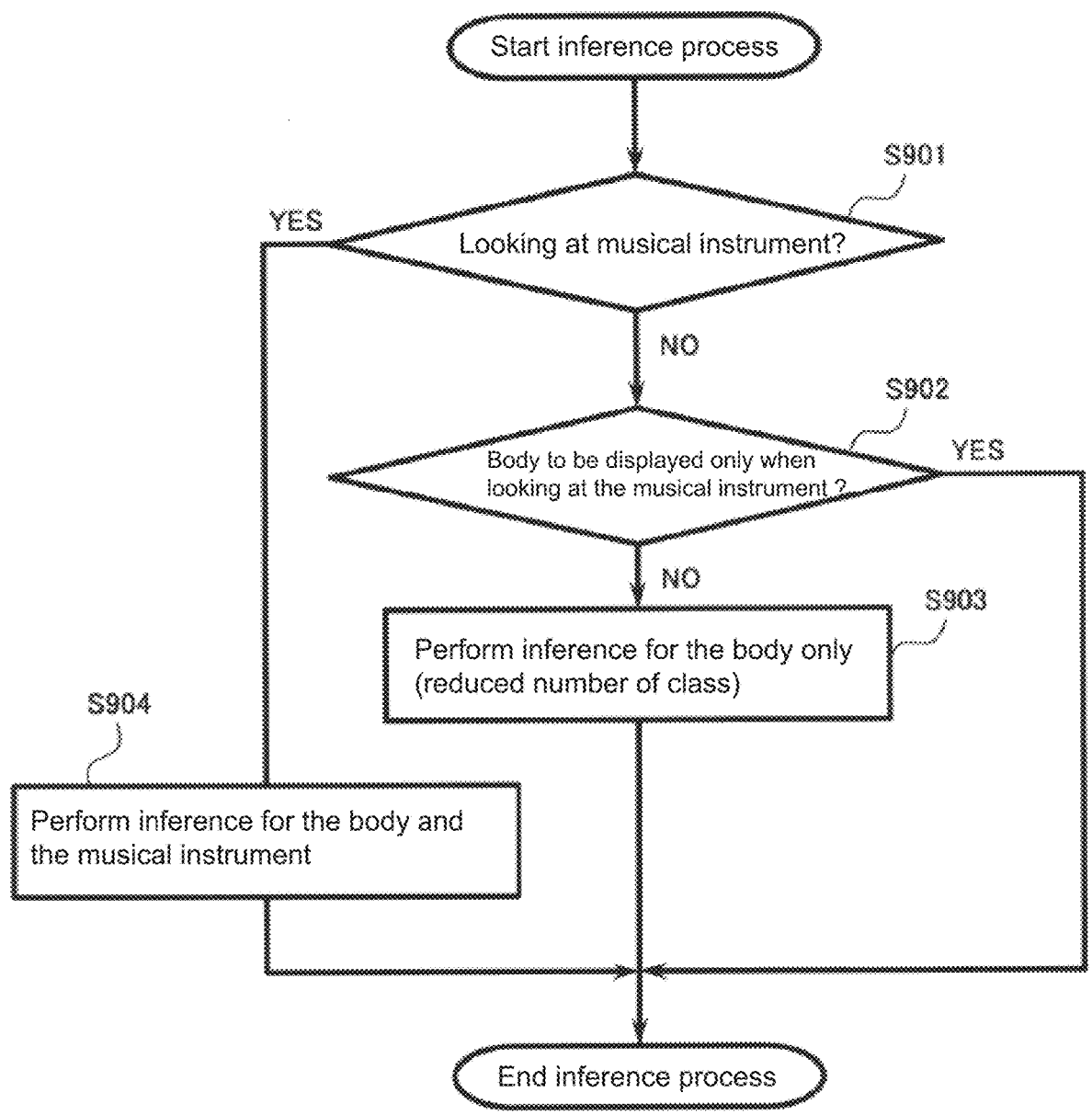
FIG. 9 is a flowchart showing an example of the inference processing.

FIG. 9 is a flowchart showing another embodiment of the inference process performed in the semantic segmentation in step S802 in the virtual and real images compositing process exemplified by the flowchart of FIG. 8 executed by the virtual and real images compositing computer 100.

If the inference process of semantic segmentation is always executed at the trained semantic segmentation model unit 206 with respect to the dual camera image data 211 obtained from the dual camera 104 mounted on the HMD 105 while the user is playing the musical instrument, the inference process would be executed even when the performer is not looking at the instrument or his/her body. Therefore, an error may occur in the inference result, and if that happens, there is a possibility that noise will be mixed in the resulting composite image data 214. For example, when the HMD105 is attached and the performer is facing a direction in which the musical instrument cannot be seen (for example, upward), if another real object is mistakenly recognized as a musical instrument, that object is projected in the virtual space.

Therefore, in this embodiment described below, the inference process of semantic segmentation is executed only under specific conditions.

First, by using a switch (not shown) of the HMD 105, the performer decides in advance whether the body should be displayed only when the instrument is being viewed or the body should always be displayed. After that, the CPU 101 starts executing the virtual and real images compositing process shown in the flowchart of FIG. 8.

Then, when executing the inference process of the semantic segmentation in step S802 of FIG. 8, the CPU 101 executes the process of the flowchart of FIG. 9 instead of step S802.

In FIG. 9, first, in the dual camera image data 211, the CPU 101 first obtains the user's line-of-sight data acquired from the line-of-sight detection unit (for example, a posture sensor included in the head-mounted display) that detects the direction in which the user is looking. Therefore, it is determined whether or not the performer is looking at the musical instrument (step S901).

If the determination in step S901 is YES, the CPU 101 proceeds to step S904 and executes semantic segmentation inference processing for both body and musical instrument. After that, the CPU 101 ends the inference processing of the flowcharts of FIGS. 9 and 8 for the current frame image.

If the determination in step S901 is NO, then the CPU 101 determines whether or not the setting is such that the performer should see the body only when looking at the musical instrument (step S902).

If the determination in step S902 is YES, the CPU 101 does not execute the inference process, and ends the process of the flowchart of FIG. 9, which is performed in place of step S802 of FIG. 8. In this case, the CPU 101 does not execute the subsequent process of step S803 in FIG. 8, and in step S804 of FIG. 8, it executes a display process of only the virtual space image/video data 213 on the HMD 105.

If the determination in step S902 is NO, the CPU 101 executes a semantic segmentation inference process for the body only. Here, when using the three-class classification model for classifying into three classes of body, instrument, and background as described above, the pixels classified as body are used as it is, and the pixels classified as background and the instrument are made as transparent. Alternatively, a new model for performing segmentation of the body part only may be created and the inference process may be executed. After that, the CPU 101 ends the process of the flowchart of FIG. 9, which replaces step S802 of FIG. 8, for the current frame image. In this case, the CPU 101 generates the cutout data 212 of the body only (i.e., without the instrument) in the subsequent step S803 of FIG. 8.

Various methods can be adopted as the process of determining whether or not the musical instrument is being viewed in step S901, as follows.

(1) Judgment Method Based on Angle

Figure 10A:
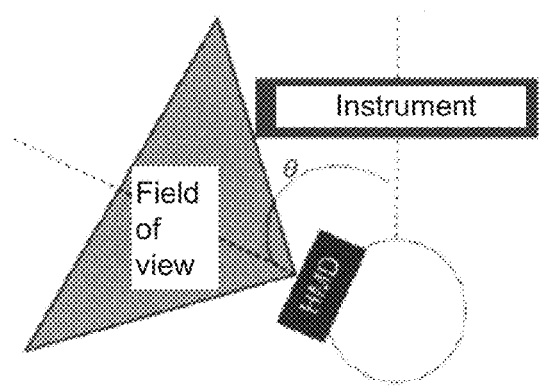
FIGS. 10A-10C are explanatory drawings showing a method of determining whether or not a musical instrument is viewed from an viewing angle of the user.
Figure 10B:
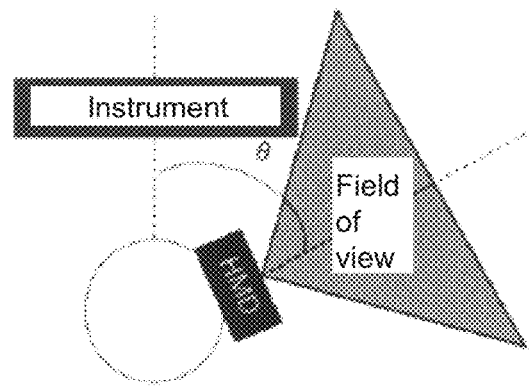
Figure 10C:
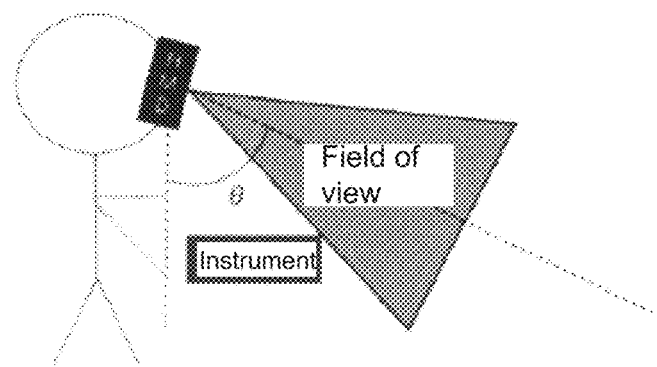

FIGS. 10A-10C are explanatory diagrams for a method for determining whether or not a musical instrument is viewed by the performer in terms of the direction in which the HMD is oriented. In this method, as shown in FIGS. 10A, 10B, and 10C, the CPU 101 determines whether the musical instrument is within the field of view of the camera by assuming that the performer is in a fixed position and by determining the direction in which the camera attached to the HMD 105 is oriented. If the camera direction is such that the field of view of the camera would include the musical instrument, the CPU 101 determines that the performer is looking at the musical instrument, and if the camera direction is such that the field of view of the camera would not include the musical instrument, the CPU 101 determines that the performer is not looking at the musical instrument. Here, it may be configured such that the performer can set an angle range from the camera and the CPU 101 may determine that the performer is looking at the musical instrument when the camera direction is such that the musical instrument would be within the set angle range, which may be narrower or wider than the field of view of the camera.

(2) Judgment Method by Object Detection

For example, a known object detection technique may be employed on the dual camera image data 211 from the dual camera 104, and when a musical instrument is detected in the image data 211, it may be determined that the performer is looking at the musical instrument.

(3) Judgment Method Using an Infrared Sensor

In the current mainstream HMD 105, the user's positional information is tracked by an infrared sensor because the user typically move around freely in the virtual space. Therefore, for example, a known device called a VIVE tracker may be employed to track the position information of the user and/or the musical instrument, and further inputs the size of the musical instrument to determine whether or not the musical instrument is included in the viewing angle of the camera attached to the HMD 105.

In this embodiment of the example of inference process of semantic segmentation described above, it is possible to significantly reduce the erroneous output of inference process in a system in which an actual musical instrument is played in a virtual space. Further, since the inference process is not always executed, the machine load (calculation amount) of the virtual and real images compositing computer 100 can be reduced.

The embodiments described above are for musical instruments, but applications of them are not limited to musical instruments.

FIGS. 11A-11C are explanatory diagrams where the object targeted by the cutout data 212 in the embodiment of FIG. 2 is not a musical instrument but, for example, a canned beverage and a part of the user's body. By using the technique of generating the cutout data 212 of the semantic segmentation described above and by training a semantic segmentation model using the synthesized training input data 209A (#1) and the corresponding synthesized training correct answer data 209B (#1) in which the canned beverage is a soda beverage, the synthesized training input data 209A (#2) and the corresponding synthesized training correct answer data 209B (#2) in which the canned beverage is a cola beverage, and the synthesized training input data 209A (#3) and the corresponding synthesized training correct answer data 209B (#3) in which the canned beverage is a coffee beverage, it is possible to composite the actual cutout data 212 of any canned beverage with the virtual space regardless of the type of the canned beverage the user is dealing with.

FIGS. 12A-12B are an explanatory diagrams where the object targeted by the cutout data 212 in the embodiment of FIG. 2 is not a musical instrument but, for example, a smartphone and a part of the user's body. By using the technique of generating the cutout data 212 by the semantic segmentation described in the present specification and by training a semantic segmentation model using various input data and the corresponding correct answer data for the positional relationship between the user and the smartphone, such as synthesized training input data 209A (#1) and synthesized training correct answer data 209B (#1) and synthesized training input data 209A (#2) and synthesized training correct answer data 209B (#2) of FIGS. 12A and 12B, for example, it is possible to composite the actual cutout data 212 with the virtual space regardless of the way the user holds or interacts with the smartphone.

According to the embodiments described above, the trained semantic segmentation model data 210 has been created in advance and set in the virtual and real images compositing computer 100, and it is possible to extract (cutout) a desired object, such as a piano and/or a part of the user's body, pixel by pixel, from the video images captured by the dual camera 104 from the user's viewpoint and to display them in a virtual space. As a result, the following effects can be obtained, for example.

(1) When only the body image, as seen from the user's viewpoint, is cut out, it is possible for the user to enter the 360-degree image or the virtual space as himself/herself, instead of as an avatar, and it is possible to further increase the immersive feeling in the virtual space on the user.

(2) When the body and the musical instrument, as seen from the user's viewpoint, are cut out, the user can experience playing the actual musical instrument in a virtual space. For example, it is possible to realize a live experience in a virtual space.

(3) As described in the embodiment shown in FIGS. 11A-11C, when the body and the drink, as seen from the user's viewpoint, are cut out, it is possible to drink the drink while having fun in the virtual space (without removing the HMD 105).

(4) As described in the embodiment shown in FIGS. 12A-12B, when the smartphone, as seen from the user's viewpoint, is cut out, it is possible to operate the real smartphone in the virtual space.

As described above, as long as the trained semantic segmentation model data for cutting out a desired object(s) is created, anything can be displayed in the virtual space.

In some of the embodiments described above, an electronic musical instrument and a part of the user's body that operates the electronic musical instrument are brought into the virtual space as the desired objects to be brought into the virtual space from the captured image data obtained by capturing the real space. As another embodiment, a part of the user's body may be drawn by three-dimensional computer graphics, and the movement of the user's body may be detected based on data that are capable of detecting the movement of the user's body, which data may include the captured image data. Then, the movement of the three-dimensional computer graphics may be generated based on the detected movement of the user's body. In this case, a two-class classification model that classifies a desired object such as a musical instrument and a background may be used as a trained model.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention. For example, the functions executed in the above-described embodiments may be combined as appropriate. The above-described embodiments include various steps, and various inventions can be extracted by an appropriate combination according to a plurality of disclosed constitutional requirements. For example, even if some constituent requirements are omitted from the constituent requirements shown in the embodiment, if the same effect is obtained, the configuration in which the constituent requirements are omitted can be regarded as an invention.

What is claimed is:

1. A method for generating virtual and real composite image data, comprising:
    acquiring captured image data capturing an image of a real space as seen from a user's point of view;
    determining whether a user's line-of-sight data indicates that the user is looking at a target object;
    when the user's line-of-sight data indicates that the user is looking at the target object, inputting the captured image data into a trained model, the training model outputting segmentation data segmenting the captured image data into a first region in which the target object is displayed, a second region in which at least a part of the user's body is displayed, and a third region that is other than the first and second regions; and
    compositing data of the first region and data of the second region with a virtual space image data based on the segmentation data,
    wherein when the user's line-of-sight data indicates that the user is not looking at the target object, the inputting of the captured image data into the trained model and the compositing of the data of the first and second regions with the virtual space image data are not performed.

2. The method according to claim 1,
    wherein the target object is an musical instrument, and the part of the user's body is a part of the user playing the musical instrument, and
    wherein the compositing of the data of the first region and the data of the second region with the virtual space is performed in real time.

3. The method according to claim 1,
    wherein the target object includes at least one of an musical instrument, a drink, and a portable terminal device, and
    wherein the part of the user's body includes a part of the user touching the at least one of the musical instrument, the drink, and the portable terminal device.

4. The method according to claim 1, wherein the trained model includes:
    an input layer that receives the captured image data capturing the image of the real space as seen from the user's point of view;
    an output layer that outputs the segmentation data segmenting the captured image data into the first region in which the target object is displayed, the second region in which at least the part of the user's body is displayed, and the third region that is other than the first and second regions; and one or more intermediate layers having parameters that have been trained using training data, the training data including first input image data having one of the target object and the at least the part of the user's body in each image, second input image data having both of the target object and the at least the part of the user's body in each image, and third input image data having neither of the target object and the at least the part of the user's body in each image, and correct answer data providing correct segmentation of the target object and the at least the part of the user's body in each image of the first, second, and third image data.

5. A system of generating virtual and real composite image data, comprising:

at least one camera capturing an image of a real space as seen from a user's point of view in real time;

one or more processors that perform the following:

acquiring captured image data capturing the image of the real space as seen from the user's point of view;

determining whether a user's line-of-sight data indicates that the user is looking at a target object;

when the user's line-of-sight data indicates that the user is looking at the target object, inputting the captured image data into a trained model, the training model outputting segmentation data segmenting the captured image data into a first region in which the target object is displayed, a second region in which at least a part of the user's body is displayed, and a third region that is other than the first and second regions; and compositing data of the first region and data of the second region with a virtual space image data based on the segmentation data, wherein when the user's line-of-sight data indicates that the user is not looking at the target object, the inputting of the captured image data into the trained model and the compositing of the data of the first and second regions with the virtual space image data are not performed.

6. A device for generating virtual and real composite image data, comprising one or more processors that perform the following:

acquiring captured image data capturing an image of a real space as seen from a user's point of view;

determining whether a user's line-of-sight data indicates that the user is looking at a target object;

when the user's line-of-sight data indicates that the user is looking at the target object, inputting the captured image data into a trained model, the training model outputting segmentation data segmenting the captured image data into a first region in which the target object is displayed, a second region in which at least a part of the user's body is displayed, and a third region that is other than the first and second regions; and compositing data of the first region and data of the second region with a virtual space image data based on the segmentation data, wherein when the user's line-of-sight data indicates that the user is not looking at the target object, the inputting of the captured image data into the trained model and the compositing of the data of the first and second regions with the virtual space image data are not performed.

7. The device according to claim 6, wherein the target object is an musical instrument, and the part of the user's body is a part of the user playing the musical instrument, and wherein the compositing of the data of the first region and the data of the second region with the virtual space is performed in real time.

8. The device according to claim 6, wherein the target object includes at least one of an musical instrument, a drink, and a portable terminal device, and wherein the part of the user's body includes a part of the user touching the at least one of the musical instrument, the drink, and the portable terminal device.

9. The device according to claim 6, wherein the trained model includes:

an input layer that receives the captured image data capturing the image of the real space as seen from the user's point of view;

an output layer that outputs the segmentation data segmenting the captured image data into the first region in which the target object is displayed, the second region in which at least the part of the user's body is displayed, and the third region that is other than the first and second regions; and one or more intermediate layers having parameters that have been trained using training data, the training data including first input image data having one of the target object and the at least the part of the user's body in each image, second input image data having both of the target object and the at least the part of the user's body in each image, and third input image data having neither of the target object and the at least the part of the user's body in each image, and correct answer data providing correct segmentation of the target object and the at least the part of the user's body in each image of the first, second, and third image data.

* * * * *